June 17, 1969  P. ZENCZAK  3,450,571
METHOD OF MAKING A COATED BATTERY SEPARATOR
Filed Dec. 13, 1965
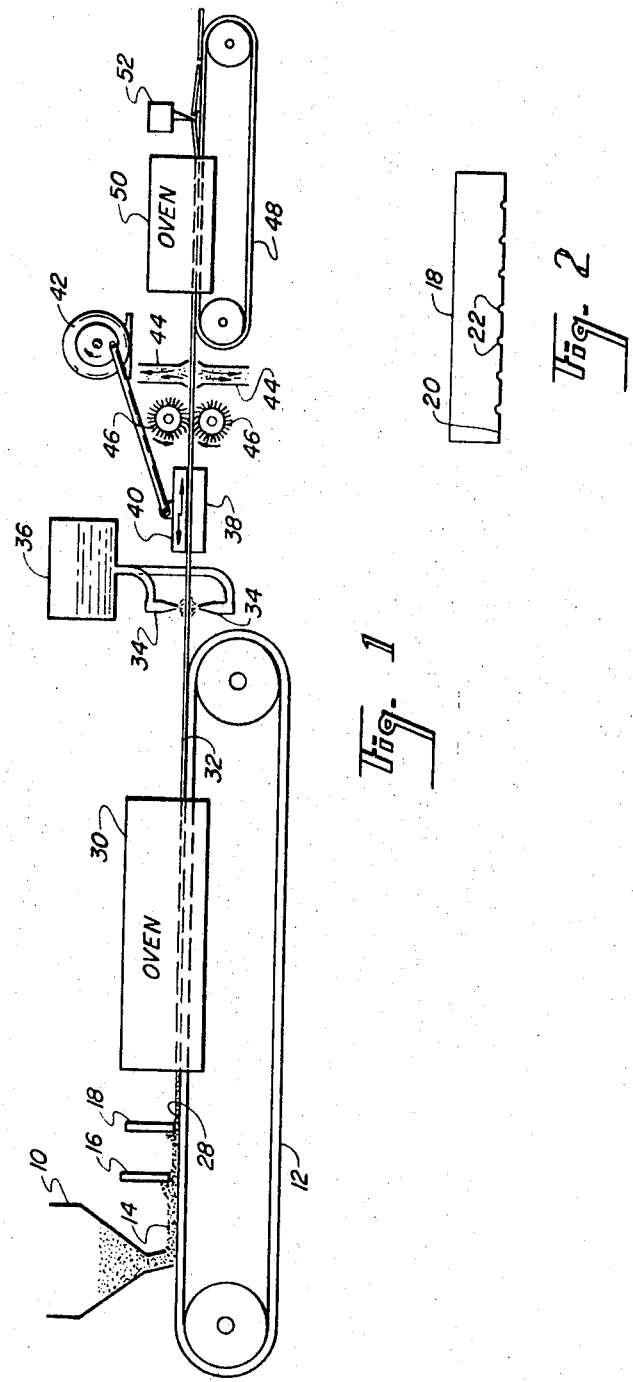
PIOTR ZENCZAK
INVENTOR
BY
BUCKHORN, BLORE, KLARQUIST & SPARKMAN
ATTORNEYS

United States Patent Office 3,450,571
Patented June 17, 1969

3,450,571
METHOD OF MAKING A COATED BATTERY SEPARATOR
Piotr Zenczak, Corvallis, Oreg., assignor to Evans Products Company, Portland, Oreg., a corporation of Delaware
Filed Dec. 13, 1965, Ser. No. 513,512
Int. Cl. H01m 3/02
U.S. Cl. 136—148                    5 Claims

ABSTRACT OF THE DISCLOSURE

A battery separator is made by coating a microporous sheet of an electrically resistant material with a mixture of a filler material and a thermoplastic resin binder material. The mixture is buffed into the pores of the base sheet with a flat platen and then sintered to bind the coating to the base sheet.

---

The present invention relates to separators of the type employed between the plates of lead-acid storage batteries for preventing short circuiting of the battery and dislodging of the chemical materials of which the plates are comprised.

The thin porous separators placed between the alternate positive and negative plates in the cells of a storage battery are necessary primarily to prevent the electrical short-circuiting of the cell either from mechanical displacement of the plates or from heat and chemical reactions. Such separators while acting as electrical insulators between the plates must permit free electrolytic conduction by ionic flow therethrough so that the internal electrical resistance of the battery is as low as possible. For the purpose of permitting ion flow the separators are provided or formed with a plurality of microporous openings therethrough. However, such openings must be of exceptionally small magnitude to prevent metal from the plates depositing in such openings and which deposits may grow or "tree" through the separator to cause a short circuit between adjacent plates. In the case of separators made by fusing finely divided thermoplastic polymers or copolymers, if such separators are formed too thin they are likely to have pinholes therein through which treeing may occur. Treeing may sometimes also occur in the case of other separators such as impregnated fibrous separators, that is, separators made by impregnating a sheet of lignocellulosic paper with a thermosetting resin such as a phenolformaldehyde resin, diffused through the sheet. As will be apparent, to maximize the porosity and minimize internal resistance and also to reduce the overall size of the battery, it is desirable to make the separators as thin as possible. Reducing the thinness is not, of course, compatible in most instances with the requirement that they have no pinholes therein since reduction in the thickness of the separators ordinarily increases the likelihood of the appearance of pinholes.

It is an object of the present invention to provide battery separators of lesser thickness than those heretofore provided but which have no pinholes or other openings therethrough through which treeing may occur.

It is another object of the invention to provide a method for manufacture of battery separators which will provide separators of desirable thinness absent from pinholes and other large diameter openings deleterious to the operation of the separator.

In accordance with the present invention, a microporous base sheet, and which may be one formed by sintering finely powdered thermoplastic materials, or one formed by impregnating with suitable resin a lignocellulosic web, or other suitable base sheet, but which is of lesser thickness than the conventionally utilized sheet, is coated with a layer of a mixture comprising a finely divided inert material, such as talc or diatomaceous earth, mixed with a heat fusible resin such as, for example, polyvinyl chloride. Such coating is brushed so as to cause penetration of the coating material into the openings on a surface of the sheet. Thereafter, any excess material is removed by brushing or light vacuuming and finally the coating is fixed in position by fusing the resin material. Such a coating functions to fill the pinholes to prevent the deposition of metal therein but at the same time still maintains a porous structure through which ions may move freely so that the finished plate may function efficiently as a separator in a storage battery.

For a more detailed description of the invention reference is made to the accompanying drawing and the following specification.

In the drawings:
FIG. 1 is a schematic representation of apparatus for making a specific form of the invention; and
FIG. 2 is an enlarged view of a forming die utilized in the apparatus of FIG. 1.

The drawing illustrates apparatus for making a battery separator of a base sheet comprised of a heat fusible resin material such as, for example, polyvinylchloride, polyethylene, polypropylene or similar polymer or copolymer or mixtures of the same. A supply of the powdered resin, preferably having no particles larger than about 100 microns and an average particle size of about 5 microns, is placed in a supply hopper 10 postioned above a conveyor 12 onto which the powder is allowed to flow in a stream 14 to be carried against a baffle 16 which helps to regulate and meter the powder flow. The powder passing beneath the baffle 16 is carried against a forming die 18 having a contour on its lower edge as shown in FIG. 2. The die 18 is formed with a substantially straight lower edge 20 having grooves 22 formed therein which permit ridges of the powder to be formed on top of the otherwise flat surface of the strip 28 which emerges from beneath the die.

From the die 18 the strip of powder 28 is carried into a sintering oven 30 in which temperatures are maintained sufficiently high to effect sintering of the particles of the strip so that the strip emerges from the oven as a sintered integral sheet 32. The ridges of the powder formed on the flat surface of the powder strip remain and appear in the sintered product as ribs projecting from the upper planar surface of the sheet 32. The sheet 32 is carried on the conveyor 12 from the oven for a period of time sufficient to permit the sheet to cool to rigidity and resist deforming under subsequent handling.

After cooling sufficiently the sheet 32 is passed from the conveyor 12 between a pair of vertically positioned nozzles 34 or other means adapted to spray or otherwise dispense against the upper and lower surfaces of the sheet 32, the coating composition to be applied thereto. The nozzles 34 can be supplied from any suitable source such as a hopper 36. Thereafter the sheet 32 is passed to a buffing mechanism including a fixed lower plate 38 and a movable upper plate or platen 40 which is adapted to be reciprocated longitudinally in the direction of movement of the sheet 32. Any suitable means can be utilized to effect reciprocation of the platen 40 such as an eccentric drive arrangement indicated generally at 42. The platen 40 and plate 38 are preferably provided with an abrasive resistant material having a nap, such as, for example, rugging. The reciprocation of the buffing platen 40 will cause the coating material to be positively and uniformly embedded in the coarse top surface of the sheet 32. The pressure of the platen 40 against the plate 38 will at the same time help to cause the coating material applied against the under surface of the sheet to be embedded in such openings and irregularities as may appear in such surface, though the bottom surface of the sheet 32 ordinarily is substantially smoother than the upper surface thereof. After emerging from between the plates 38, 40, the sheet 32 is passed between means to cause removal of excess coating material from the sheet and which may comprise a pair of vacuum heads 44 which apply a light suction to the surface to remove the loose material therefrom. Alternatively, or in addition, the surfaces may be brushed lightly with brushes indicated at 46. Thereafter the sheet 32 is fed onto a second conveyor belt 48 and carried through an oven 50 to effect heating of the coating material sufficiently to fuse the resin binder thereof thus to fix the coating material to the surfaces of the sheet 32. After emerging from the oven 50 and cooling sufficiently the sheet may finally be severed by a cutting mechanism indicated at 52 to form the individual battery separators.

As will be apparent, the invention can be applied to separator plates of various materials and, of course, the coating may be applied by any suitable apparatus and by methods and procedures other than those described herein. For example, the coatings of the invention can be applied to separator plates made of fibrous cellulosic materials such as those shown and described in my Patent No. 2,882,331. In general, the coating of the invention and the process of applying the same may be utilized in connection with any separator wherein the base sheet is subject to the presence of pinholes. By reason of the fact that the coating of the invention fills such pinholes and prevents the occasion of treeing therethrough it is possible to decrease the thickness of the base sheets utilized in connection with the invention beyond that which they ordinarily may be decreased even though such decrease may cause an increase in the number of pinholes to an otherwise unacceptable amount. In some instances it may be sufficient to apply the coating to only one side of the base sheet, but ordinarily it will be desirable to coat both surfaces.

The filler of the coating of the invention may be one of many inert silicates or other minerals that will not dissolve in or react unfavorably with the battery electrolyte and which can be reduced to a suitably fine powder. For example, the filler may comprise talc, aluminum silicate, pyrophyllite, wollastonite, or iron free clay. A silica in the form of diatomaceous earth or talc is particularly preferred.

The size of the filler particles may vary depending upon the nature of the base sheet with which the filler is to be utilized and the properties which it is desired the coating to possess, but in general a satisfactory size range may be from about 1 to 10 microns, the particles preferably being between about 3 to 5 microns.

The ratio of binder resin to filler material is preferably between about 40 to 60 percent resin and 60 to 40 percent filler. The ratio may be varied depending upon the resin, the filler and the base sheet to provide optimum results which may be determined by routine testing.

Various binder resins may be utilized. The resin obviously should be an acid resistant type and preferably should be fusible at a temperature sufficiently low that the coating may be satisfactorily fused without injury to the base sheet. Suitable resins include such thermoplastics as polyvinyl chloride, polyethylene, propylene and similar polymers and copolymers. The binder resin should be in finely powdered form so that the particles thereof may enter the pinholes and surface irregularities of the sheet. Preferably the resin should be of a maximum particle size of about one micron.

The amount of coating material applied to a particular separator will vary depending upon the receptiveness of the separator to the filler. A base separator which is of fine texture will, of course, accept less coating material than one of coarser texture. In general an excess of coating material is applied and the surplus brushed or buffed to effect penetration of the coating particles into the surface irregularities of the base separator, and thereafter the excess material is removed by dusting or vacuuming as described above. In the instance of separators made in accordance with my prior Patent No. 2,882,331 an acceptable separator was formed by applying one half pound of a mixture comprising sixty percent polyvinylchloride (PVC) and forty percent diatomaceous earth to 1,000 separators 4¾ inches by 5¹³⁄₁₆ inches.

In the instance of separators formed by sintering of polyvinylchloride, suitable separators were obtained by applying one half gram of 60% PVC–40% diatomaceous earth mixture to each separator having the size above given.

The fusing temperature and period of fusing will, of course, depend upon the nature of the binding material. In the instance of polyvinylchloride the fusing is preferably carried out by exposing the coatings to a temperature of 340° F. for about thirty seconds.

Ordinarily a seperator plate formed of polyvinylchloride and of the size previously mentioned must have between ten to twelve grams of material therein to hold pinholes to a desired minimum. I have found that by virtue of the improvements to be attained by coating a base sheet as described above, the base sheet may be reduced in weight about five or six grams. The coating itself only adds about one-half to one gram to the total weight hence a substantial savings in material is attained. In addition, the separator is much thinner resulting in a saving in space, which is of great importance in that it permits a reduction in the overall size of the battery.

The coating of the invention causes negligible increase in the electrical resistance of a separator plate the increase being only of the order of 0.002 to 0.004 ohm/in. for a coating of one side.

Having illustrated and described a preferred embodiment of the invention it should become apparent to those skilled in the art that the invention permits of modification in arrangement and detail. I claim all such modifications as come within the spirit and scope of the appended claims.

I claim:

1. The process of making a battery separator which comprises the steps of:

forming a microporous sheet of an electrically resistant material, applying a coating comprising a mixture of a finely divided inert mineral material and a heat fusible resin to a surface of said sheet said mixture comprising at least forty percent inert material, buffing said coating with a flat platen to effect movement of said inert material and said resin thereof into the intricacies of the surface of said sheet, removing the excess material of said coating from said sheet, and subjecting said sheet to an elevated temperature to effect curing of said resin.

2. A method of forming a battery separator which comprises the steps of:

forming a layer of finely divided particles of a heat fusible resin, exposing said layer to an elevated temperature sufficiently long to effect sintering of said particles at their points of contact thus to form a porous sheet thereof, spreading a coating comprising a mixture of heat fusible resin and finely divided inert filler upon a surface of said sheet, said mixture containing at least forty percent inert filler, buffing said coating with a flat platen to effect movement of said filler and said resin thereof into the intricacies in the surface of said sheet, and heating said sheet and coating to sinter the resin of said coating thereby to bond said coating to said sheet.

3. A method as set forth in claim 2 wherein said resin comprises polyvinylchloride and said filler comprises diatomaceous earth.

4. A method as set forth in claim 2 wherein said resin comprises polyvinylchloride and said filler comprises talc.

5. A method as set forth in claim 3 wherein said polyvinylchloride particles in said layer are less than 100 microns and have an average size of 5 microns.

References Cited

UNITED STATES PATENTS

| 2,564,397 | 8/1951 | Duddy | 136—146 |
| 3,188,243 | 6/1965 | Booth et al. | 136—146 XR |
| 3,228,802 | 1/1966 | Rabl | 136—145 |

ALLEN B. CURTIS, *Primary Examiner.*

D. L. WALTON, *Assistant Examiner.*

U.S. Cl. X.R.

117—21; 136—145, 230